(12) United States Patent
Patil et al.

(10) Patent No.: US 10,581,705 B2
(45) Date of Patent: Mar. 3, 2020

(54) SMART SERVICE CATALOGS BASED DEPLOYMENT OF APPLICATIONS

(71) Applicant: VMWARE, INC., Palo Alto, CA (US)

(72) Inventors: Rayanagouda Bheemanagouda Patil, Pune (IN); Rahul Kumar, Pune (IN)

(73) Assignee: VMware, Inc., Palo Alto, CA (US)

( * ) Notice: Subject to any disclaimer, the term of this patent is extended or adjusted under 35 U.S.C. 154(b) by 213 days.

(21) Appl. No.: 15/791,437

(22) Filed: Oct. 24, 2017

(65) Prior Publication Data

US 2019/0014015 A1 Jan. 10, 2019

(30) Foreign Application Priority Data

Jul. 4, 2017 (IN) .............................. 201741023491

(51) Int. Cl.
*H04L 12/24* (2006.01)
*H04L 29/08* (2006.01)
*G06F 8/61* (2018.01)
*G06F 9/50* (2006.01)

(52) U.S. Cl.
CPC ............ *H04L 41/5096* (2013.01); *G06F 8/63* (2013.01); *G06F 9/5011* (2013.01); *H04L 41/22* (2013.01); *H04L 41/5048* (2013.01); *H04L 41/5051* (2013.01); *H04L 67/10* (2013.01); *H04L 67/16* (2013.01); *H04L 41/0843* (2013.01)

(58) Field of Classification Search
USPC ....................................................... 709/223
See application file for complete search history.

(56) References Cited

U.S. PATENT DOCUMENTS

| | | | | |
|---|---|---|---|---|
| 2010/0125844 | A1* | 5/2010 | Mousseau ................. | G06F 9/50 718/1 |
| 2014/0201372 | A1* | 7/2014 | Bauer ..................... | H04L 67/36 709/226 |
| 2015/0378702 | A1* | 12/2015 | Govindaraju ............. | G06F 8/61 717/177 |
| 2016/0019096 | A1* | 1/2016 | Winterfeldt ............... | G06F 8/60 717/177 |

* cited by examiner

*Primary Examiner* — Hermon Asres
(74) *Attorney, Agent, or Firm* — Thomas | Horstemeyer, LLC

(57) ABSTRACT

Techniques for smart service catalogs based deployment of applications in a cloud computing environment are disclosed. In one embodiment, resource information required to deploy an instance of an application is retrieved from a blueprint associated with a client. Further, available resource information may be obtained from a resource reservation associated with the client. A maximum number of instances of the application that can be deployed corresponding to the client is determined based on the resource information required to deploy the instance of the application and the available resource information. A service catalog including the maximum number of instances of the application that can be deployed based on the blueprint is generated. The service catalog is used to enable deployment of at least one instance of the application corresponding to the client.

23 Claims, 6 Drawing Sheets

SMART SERVICE CATALOGS BASED DEPLOYMENT OF APPLICATIONS

RELATED APPLICATIONS

Benefit is claimed under 35 U.S.C. 119(a)-(d) to Foreign Application Serial No. 201741023491 filed in India entitled "SMART SERVICE CATALOGS BASED DEPLOYMENT OF APPLICATIONS", on Jul. 4, 2017, by VMware, Inc., which is herein incorporated in its entirety by reference for all purposes.

TECHNICAL FIELD

The present disclosure relates to cloud computing environment and, more particularly, to deployment of applications in a cloud computing environment based on smart service catalogs.

BACKGROUND

In cloud computing design, numerous tools exist to create and deploy applications (e.g., applications including one or more virtual machines connected to each other in a particular topology) in cloud environments. For example, application provisioning tools facilitate cloud computing designers to create and standardize application deployment topologies on infrastructure clouds. Some application provisioning tools include graphical user interfaces (GUIs) that enable designers to generate application deployment topologies called application blueprints, which define structures and configurations of applications. Once a blueprint is designed to define an application, the blueprint can be used to deploy multiple instances of the application to many cloud environments. VMware vRealize Automation® can automate the delivery of personalized infrastructure, applications and custom information technology (IT) services using the blueprints. An administrator can deploy multiple instances of the application using already created blueprints without a need to specify the configuration properties.

Figure 1:
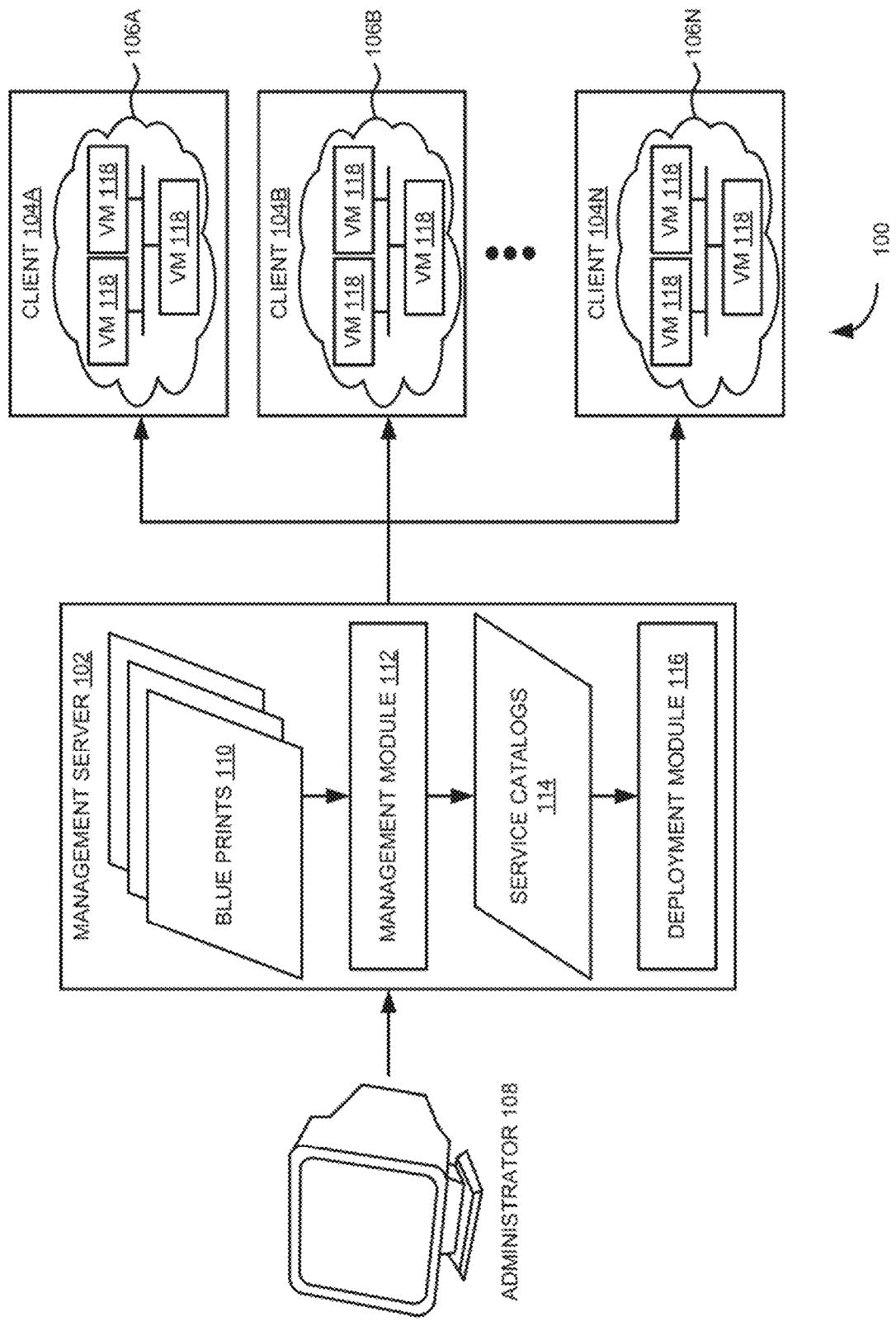
FIG. 1 is a block diagram of an example system for managing deployment of applications within one or more cloud computing environments based on smart service catalogs.

The drawings described herein are for illustration purposes only and are not intended to limit the scope of the present subject matter in any way.

DETAILED DESCRIPTION

Embodiments described herein may provide an enhanced computer-based and network-based method, technique, and system for deploying applications in a cloud computing environment based on smart service catalogs. In the cloud computing environment, a management server may communicate with multiple clients, with each client (i.e., a client group having a group of members) associated with resource reservations to accommodate virtual machines. A resource reservation may allocate a share of memory, central processing unit (CPU), and storage resources on a compute resource for a client to use. In such an environment, a corresponding number of virtual machines can be created for each client and the resources may be allocated for each virtual machine to support application operations. For example, the client may be a customer, a business group, a tenant, an enterprise, and the like.

An administrator can create blueprints that can only be entitled to users in a specific client. For example, when a client's member requests a virtual machine, the virtual machine can be provisioned according to the specifications in the blueprint, such as a CPU, memory, and storage. An example of a blueprint may specify a Windows 7 developer workstation with one CPU, 2 GB of memory, and a 30 GB hard disk. The blueprints can be mapped to the clients. For example, blueprints can be either specific to a business group or shared among business groups in a tenant.

In a virtual data center, applications can be deployed based on the blueprints, which describe computing resources and application components to be executed on the computing resources. For example, a blueprint can describe one or more virtual machines and software application components to be executed on the virtual machines. Administrators (e.g., IT professionals) may manage cloud computing resources using advanced management software, such as vRealize Automation® and vCloud® Automation Center™ from VMware. Such management software may provide a secure portal where authorized administrators, developers, and/or business users can request new IT services and perform management operations, such as provisioning and configuration of applications. For example, an authorized user may log into a cloud computing manager to browse a catalog of IT services, such as infrastructure, applications, desktops, and the like, and submit a request for such services. In response, the management application may provision the requested IT services, allowing the user to deploy and scale cloud resources for various online applications.

When applications (i.e., applications including one or more virtual machines connected to each other in a particular topology) are deployed to a cloud infrastructure, a number of errors may occur in connection with the deployment. The cloud infrastructure may have insufficient resources available to host virtual machines that are to be deployed for the application. A request to deploy virtual machines to the cloud infrastructure that lacks sufficient computing resources or that violates a cloud infrastructure policy can result in a failure of deployment.

For example, an administrator may have no idea about a maximum number of possible deployments that can happen with a configuration specified in a blueprint and the resources reserved for the mapped client (e.g., business unit). In such cases, the administrator may have to manually perform calculations to accept a request raised by a client. The administrator may have to regularly check the resource reservation to keep track of available resources. Based on the available resources, actual number of successful blueprint deployments and feasibility of all components in the blueprint can be determined. Such manual process may lead to over sight or manual errors and can potentially cause deployment failures.

Further, consider a use case where the administrator has created two blueprints, one with a heavy configuration say blueprint "A" and the other with a light weight configuration say "B". Further, consider that the administrator has decided to deploy both the blueprints but the resource is marginally short of accommodating deployment of heavy configuration blueprint. Administrator first requests "A" and then immediately requests "B". In this case, as expected, the blueprint "A" deployment may fail, however the blueprint "B" deployment may also fail even though the resources are sufficient for accommodating the blueprint "B" deployment. Also, the deployment failure may not be validated at user interface (UI) level. The actual request may go to a management application and then the management application deploys the edge and starts the virtual machine deployments. After deploying few virtual machines, the management application may get to know that the resources are not sufficient for further deployment of virtual machines. Therefore, all the virtual machines and infrastructure (edge) clean-up can be performed, which can waste administrator's time and management application CPU cycles. For example, management application may be vSphere virtual center that is offered by VMware. Management application can be provided in a physical server, VM, or container.

Examples described herein may provide a server including management applications to enable deployment of applications in a cloud computing environment based on smart service catalogs. The server may retrieve resource information required to deploy an instance of an application from a blueprint associated with a client. Further, the server may obtain available resource information from a resource reservation associated with the client. Furthermore, the server may determine a maximum number of instances of the application that can be deployed corresponding to the client based on the resource information required to deploy the instance of the application and the available resource information. In addition, the server may generate a service catalog including the maximum number of instances of the application that can be deployed based on the blueprint. The service catalog can be used to enable deployment of at least one instance of the application corresponding to the client. Examples described herein may enable automatic selection between linked clone or simple clone, thin or thick provision of the virtual machines based on the requirement.

In the service catalog, the maximum number of possible deployments for the blueprint can be displayed. Hence, the administrator may have an estimate of the maximum number of possible deployments for that blueprint in advance. In service catalog, if a blueprint does not have sufficient resources for the client, then the blueprint request link can be graded out, which indicates that the blueprint cannot be deployed. In service catalog for graded out blueprint, an amount of resources required for successful deployment of at least one instance of blueprint can be displayed. This can avoid any manual computation errors and automate the deployment precondition requirement process. In service catalog, displaying the amount of resources required for successful deployment can avoid conflict of blueprints competing for the reserved resources.

Examples disclosed herein may be implemented in connection with cloud computing environments that use virtual machines and/or containers. A virtual machine is a data computer node that operates with its own guest operating system (OS) on a host using resources of the host virtualized by virtualization software. A container is a data computer node that runs on top of a host OS without the need for a hypervisor or separate OS.

SYSTEM OVERVIEW AND EXAMPLES OF OPERATION

FIG. 1 is a block diagram of an example system 100 for managing deployment of applications within one or more cloud computing environments based on smart service catalogs. Cloud computing environments (e.g., virtualized cloud computing environments) may include one or more computing platforms that support the creation, deployment, and management of virtual machine-based cloud applications. One such platform is the vCloud® Automation Center, which is commercially available from VMware. While vCloud® Automation Center is one example of a cloud deployment platform, it should be noted that any computing platform that supports the creation and deployment of virtualized cloud applications is within the scope of the present invention.

As shown in FIG. 1, system 100 may include a management server 102 and clients 104A-104N that are in communication with management server 102. Management server 102 may refer to a computing device, or computer program (i.e., executing on a computing device), that provides some service to clients 104A-N. Management server 102 may connect to the cloud deployment platforms either directly or over a network (e.g., over a local-area network, wide-area network, wireless network, or the like).

Each client 104A-N may be associated with a resource reservation to support application operations. Example client 104A-N may be a customer, business group, tenant, an enterprise, and the like. A resource reservation may allocate a share of the memory, CPU and storage resources on one or more computing resources for a client to use. For example, clients 104A-N may be provisioned with resource reservations to provide corresponding deployment environments 106A-N in which clients 104A-N can deploy their applications (e.g., multi-tier applications). Deployment environments 106A-N may be provided by cloud computing platform providers. In one example, applications may be developed using multi-tier architectures in which functions such as presentation, application processing, and data management are logically separate components. For example, an enterprise's custom banking application that has a multi-tier architecture may use a cluster of application servers (e.g., Moss Application Servers) to execute in a scalable runtime environment, a relational database management system (e.g., MySQL) to store account data, and a load balancer to distribute network traffic for robustness.

Each client 104 may include a group of users/members having access to the resources allocated to client 104. In one example, each client 104 can have multiple resource reservations on the same compute resource or different compute resources, or any number of physical reservations containing any number of physical machines. Each client 104A-N may associate a set of services and resources to a set of users, often corresponding to a line of business, department, or other organizational unit. For example, clusters of host computers may be used to support clients 104 for executing various applications. Each of the clusters can include any number of host computers ranging from one to several hundred or more.

In cloud computing environments, a number of virtual machines can be created for each client and resources (e.g., CPU, memory, storage, and the like) may be allocated for each virtual machine to support application operations. In some examples, a virtual machine is an emulation of a particular computer system that operates based on a particular computer architecture, while functioning as a real or hypothetical computer. Virtual machine implementations may involve specialized hardware, software, or a combination of both. In the illustrated example of FIG. 1, an application runs on an example virtual machine 118 in deployment environment (e.g., 106A) corresponding to client (e.g., 104A). Thus, in FIG. 1, virtual machines 118 are depicted as instantiated in the cloud computing environment by management server 102. Note that management server 102 instantiates virtual machines 118 upon being requested to do so.

Figure 2:
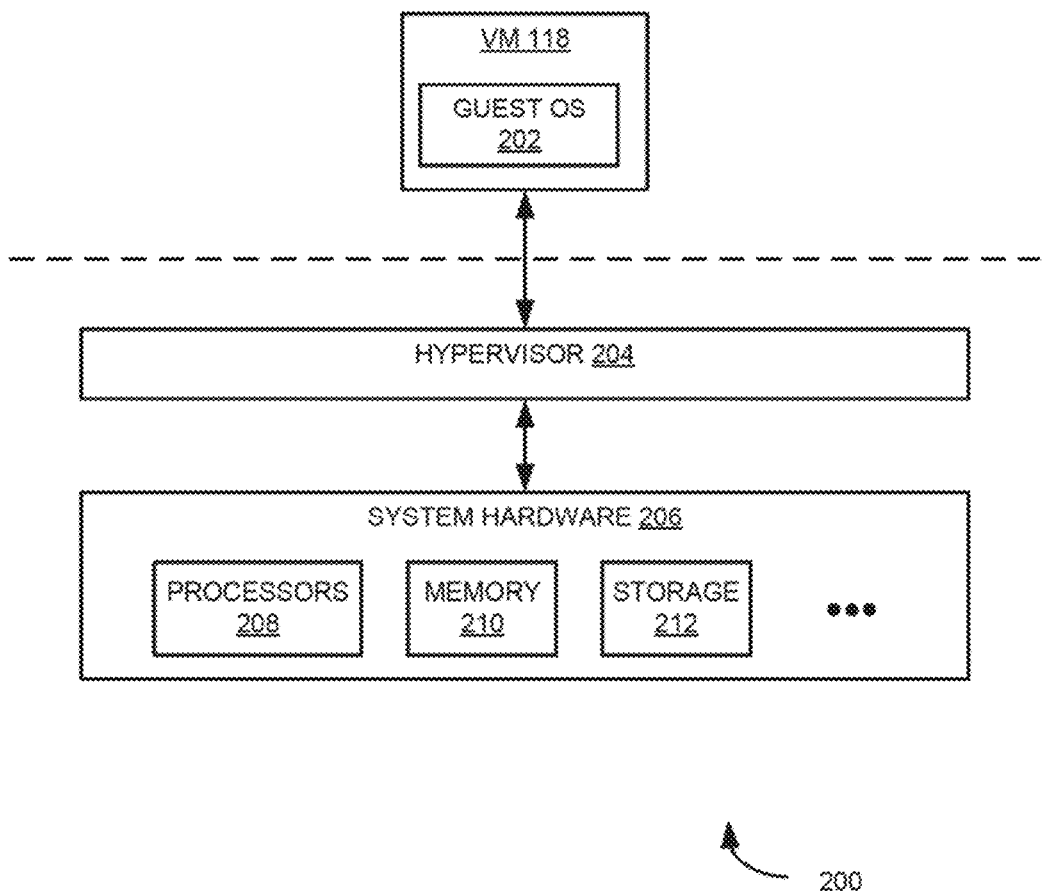
FIG. 2 is a block diagram illustrating a virtualized computer system with which one or more embodiments of the present disclosure may be utilized.

Referring now to FIG. 2, which is a block diagram illustrating an example virtualized computer system 200 with which one or more embodiments of the present disclosure may be utilized. Management module 112 may provision virtual machines (e.g., VMs 118) to provide a deployment environment 106 in which a client 104 can deploy its multi-tier application. Each virtual machine 118 may include a guest operating system (OS) 202 and virtualized system hardware, which includes one or more virtual CPUs, virtual system memory, one or more virtual disks, one or more virtual devices, etc., all of which are implemented in software to emulate the corresponding components of an actual host computer. Guest OS 202 included in each virtual machine 118 includes a file system, which stores various files and libraries associated with applications that are running on guest OS 202.

Virtual machines 118 run on top of a hypervisor 204, which is a software interface layer that abstracts system hardware 206 into virtualized hardware, thereby enabling sharing of system hardware 206 of computer system 200 amongst virtual machines 118. Hypervisor 204 acts as an interface between virtual machine 118 and system hardware 206 for executing virtual machine-related instructions and for transferring data to and from machine memory 210, processor(s) 208, storage 212, and the like. It should be recognized that system hardware 206 also includes, or is connected to, registers, interrupt handling circuitry, a clock, memory management unit (MMU), a network interface, and the like, which, for the sake of simplicity, are not shown in the figures. Hypervisor 204 may run on top of an operating system of computer system 200 or directly on hardware components of computer system 200.

Referring to FIG. 1, management server 102 may include blueprints 110. Blueprints 110 can be mapped to corresponding ones of clients 104A-N. For example, an administrator 108 uses an associated computing device to access management server 102 to create blueprints 110 that can be entitled to users in a specific client 104A-N. For example, blueprints 110 can be either specific to a business group or shared among business groups in a tenant. In one example, blueprints 110 can be created using service templates to use a same blueprint to deploy different instances of an application using services that are different between the instances of the application.

In one example, management server 102 may include a management module 112. Management module 112 can be a part of management software residing in management server 102. During operation, management module 112 may retrieve resource information required to deploy an instance of an application from a blueprint 110 associated with client (e.g., 104A). Further, management module 112 may obtain available resource information from the resource reservation associated with client 104A. In one embodiment, management module 112 may dynamically obtain updated available resource information through data collection of the management application (e.g., vSphere virtual center that is offered by VMware) when a new resource is added, an existing resource is updated, or an existing resource is deleted from the management application corresponding to client 104A. Example resource information may include information about resources selected from a group consisting of CPU, memory, and storage.

Furthermore, management module 112 may determine a maximum number of instances of the application that can be deployed corresponding to client 104A based on the resource information required to deploy the instance of the application and the available resource information. Management module 112 may generate a service catalog 114 including the maximum number of instances of the application that can be deployed based on blueprint 110. The service catalog 114 may correspond to client 104A and is used to enable deployment of at least one instance of the application corresponding to client 104A. Entitlements in service catalog 114 can be based on clients 104. The term "entitlements" as used herein refers to clients' rights, permissions, and/or authorizations to access applications, resources, and/or services. For example, entitlements determine which clients (e.g., users and groups) can request specific catalog items or perform specific actions. Further, management module 112 may display the service catalog 114 on a GUI associated with client 104A showing the maximum number of instances of the application that can be deployed based on blueprint 110.

Management server 102 may also include a deployment module 116, which can be implemented as a part of management software residing in management server 102. Deployment module 116 may receive a request to deploy a number of instances of the application corresponding to blueprint 110. In one example, the request may be received from a member (e.g., administrator, manager, user, and the like) of the client. The member may select a blueprint and give a number of instances to deploy the application. In one example, upon receiving the request, deployment module 116 may instruct management module 112 to suspend any modifications to the resources allocated to the client, for instance, until the deployment request is served.

Deployment module 116 may determine whether the requested number of instances is less than the maximum number of instances that can be deployed using service catalog 114. Deployment module 116 may deploy the requested number of instances of the application by provisioning computing resources associated with client 104A when the requested number of instances is less than or equal to the maximum number of instances that can be deployed. In this example, management module 112 may update the service catalog 114 to show the available resources associated with the client 104A before starting of deployment of the requested number of instances of the application. For example, management module 112 may update the service catalog 114 to display the updated maximum number of instances of the blueprints that can be deployed upon excluding the resources required for deployment of the requested number of instances corresponding to blueprint 110.

When the requested number of instances is not less than the maximum number of instances that can be deployed, deployment module 116 may provide a notification to perform at least one of: a) adding resources corresponding to client 104A for successfully deploying the requested number of instances, b) reducing the requested number of instances to be deployed to less than or equal to the maximum number of instances, and c) enabling selection of another light weight blueprint or a cloned blueprint to deploy the requested number of instances of the application corresponding to the other light weight blueprint or the cloned blueprint. For example, resources required to deploy the instance of the application corresponding to the other light weight blueprint is less than that of blueprint 110. In another example, the cloned blueprint may allow the client to adjust resources in the cloned blueprint in order to accommodate the requested number of instances of the application in available resources of the client.

For example, blueprints 110 can be categorized into three levels, light weight configuration, medium weight configuration, and heavy weight configuration. In this example, the resources required (e.g., CPU usage, memory usage, and/or disk input/output usage) to deploy an application/virtual machine for each of these configurations is as follows: heavy weight configuration>medium weight configuration>light weight configuration. Therefore, when the available resources are not sufficient to deploy instances of the application corresponding to heavy weight configuration, then deployment module 116 may provide a recommendation to select a medium weight configuration or light weight configuration to deploy the requested number of instances of the application based on the available resources.

In one example, management module 112 may disable a request option to deploy instances of the application corresponding to blueprint 110 in service catalog 114 when the available resources are not sufficient to deploy instances of the application corresponding to blueprint 110. An example GUI showing service catalogs is explained in detail with respect to FIG. 3.

Figure 3:
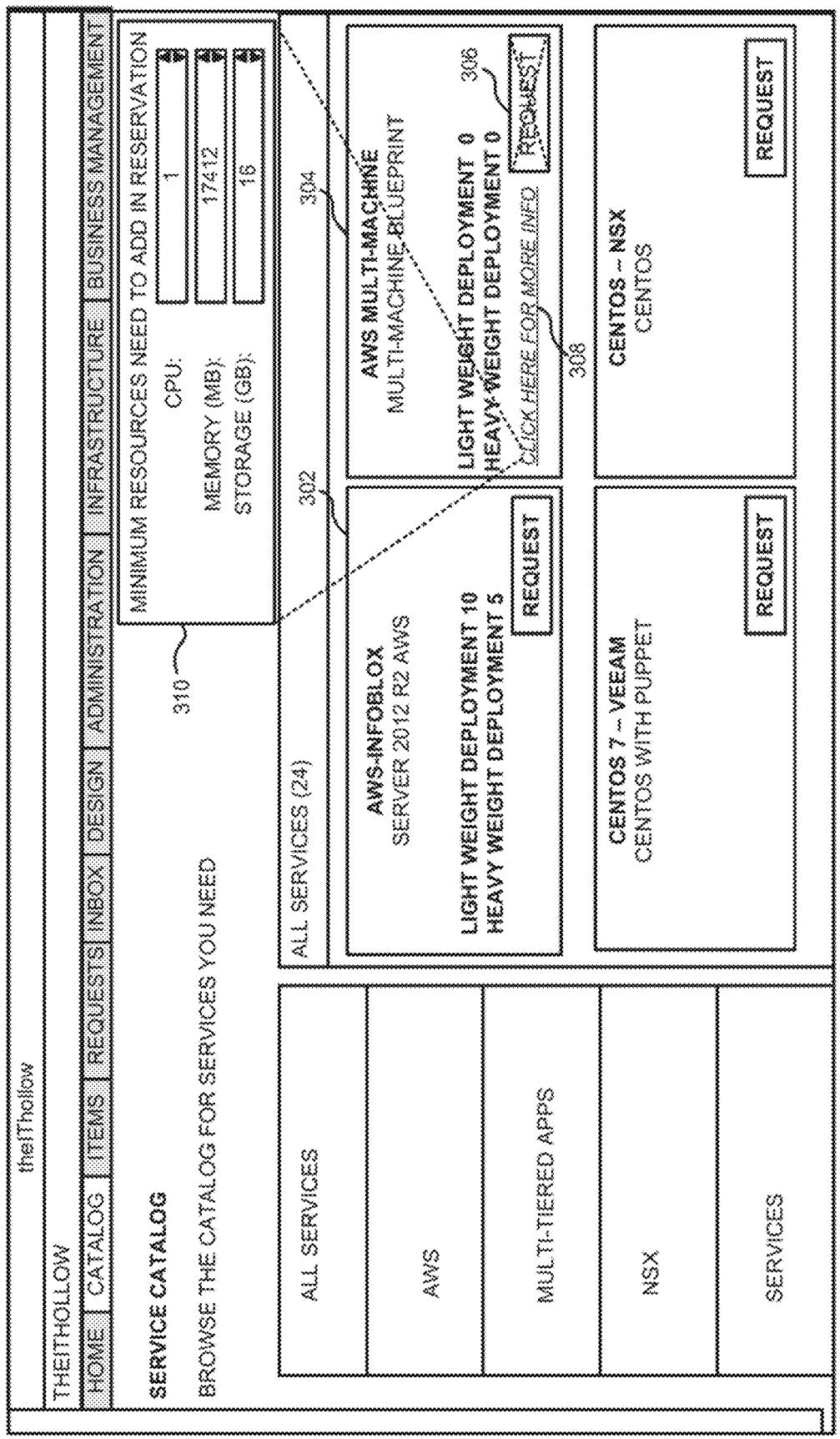
FIG. 3 is an example GUI depicting service catalogs including deployment information for deploying one or more instances of an application.

FIG. 3 is an example GUI 300 depicting service catalogs including deployment information for deploying one or more instances of the application. As shown in FIG. 3, service catalog 302 associated with a first client displays a maximum number of possible deployments for light weight deployment and heavy weight deployment as "10" and "5", respectively. In this example, resource usage for deploying an application in light weight deployment is less than the resource usage to deploy the application in heavy weight deployment. Similarly, service catalog 304 associated with a second client may display a maximum number of possible deployments for light weight deployment and heavy weight deployment as "0". As shown in FIG. 3, a "request option" 306 may be disabled/graded out in service catalog 304 since the second client does not have sufficient resources for deploying applications based on blueprints.

Also, service catalog 304 may provide an option 308 to add resources required for successful deployment of at least one instance of blueprint. As shown in 310, the deployment module 116 may compute and provide an amount of resources (e.g., minimum amount) that needs to be added in the resource reservation corresponding to the second client for successful deployment of applications based on the light weight deployment or heavy weight deployment based on the request. In another example, service catalog may provide a cost estimation for adding the minimum amount of resources for successful deployment of applications.

Examples described herein may be implemented in a cloud computing environment where a set of resources may be allocated to one or more clients. In one example, management server 102 may comprise the vCenter Server™ and vSphere® program products, which are commercially available from VMware, Inc. An example of management module 112 and deployment module 116 can be implemented in vRealize Automation®, vRealize Operations, vRealize Business, vCloud Automation Center, and/or the like that are offered by VMware. Management module 112 and deployment module 116 can be implemented in Infrastructure as a Service (IaaS), which is a component that enables the provisioning of virtualized infrastructure components in a cloud-based computing environment. IaaS is a software component that implements, from the perspective of management server 102, a catalog of virtualized devices, including virtual machines, virtual switches, and virtual storage devices. In other examples, any other suitable cloud computing platform may be used to implement management module 112 and deployment module 116.

In one example, management module 112 and deployment module 116 residing in management server 102 may be implemented as engines or modules comprising any combination of hardware and programming to implement the functionalities described herein. Each of management module 112 and deployment module 116 can be a service process in the management application or can be an appliance running in the data center to cater multiple management applications in a cloud based environment. For example, management application may be vSphere virtual center that is offered by VMware. Management application can be provided in a physical server, VM, or container.

In some examples, the functionalities described herein, in relation to instructions to implement functions of management module 112 and deployment module 116 and any additional instructions described herein in relation to the storage medium, may be implemented as engines or modules comprising any combination of hardware and programming to implement the functionalities of the modules or engines described herein.

The functions of management module 112 and deployment module 116 may also be implemented by respective processor. In examples described herein, the processor may include, for example, one processor or multiple processors included in a single device or distributed across multiple devices.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

EXAMPLE PROCESSES

Figure 4:
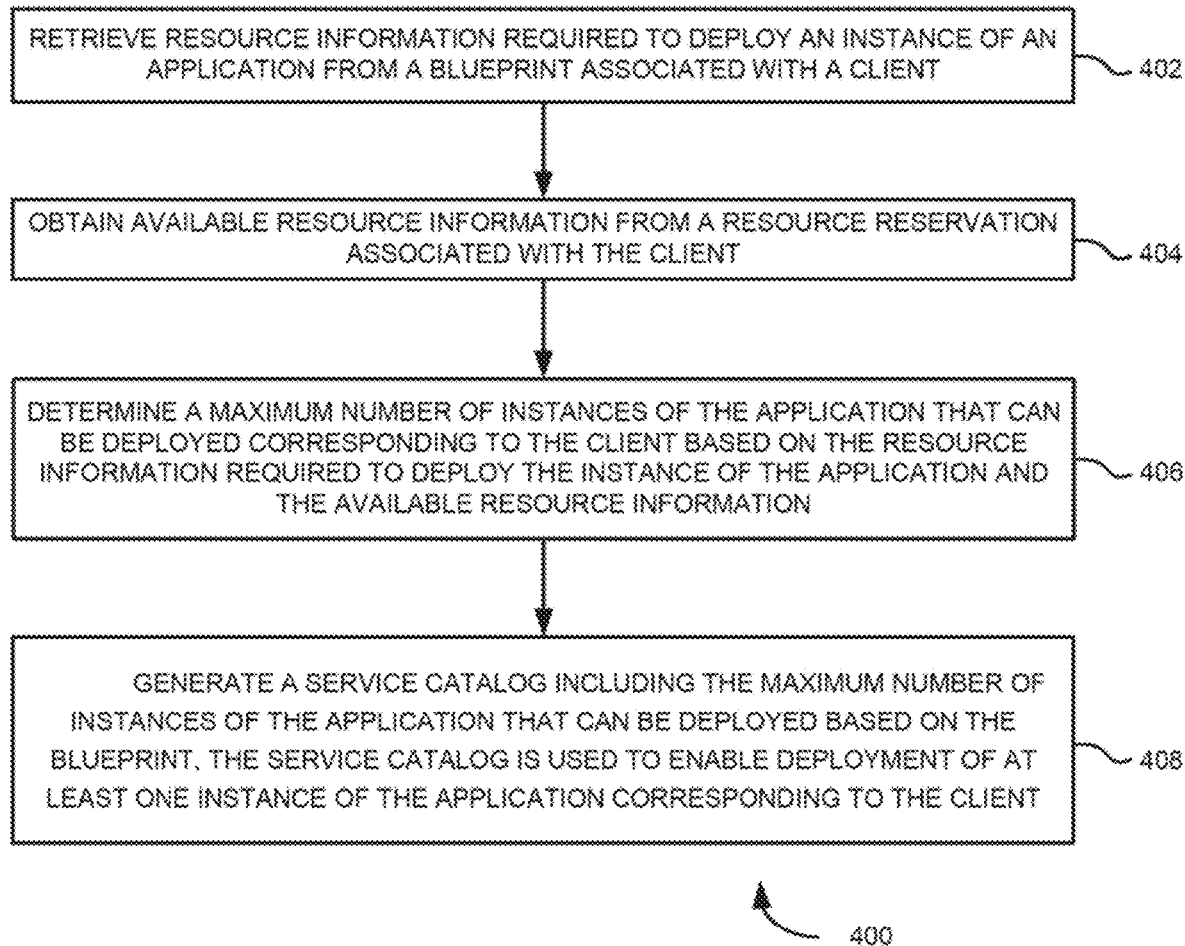
FIGS. 4 and 5 illustrate flow diagrams of example methods for deploying instances of the application based on service catalogs.
Figure 5:
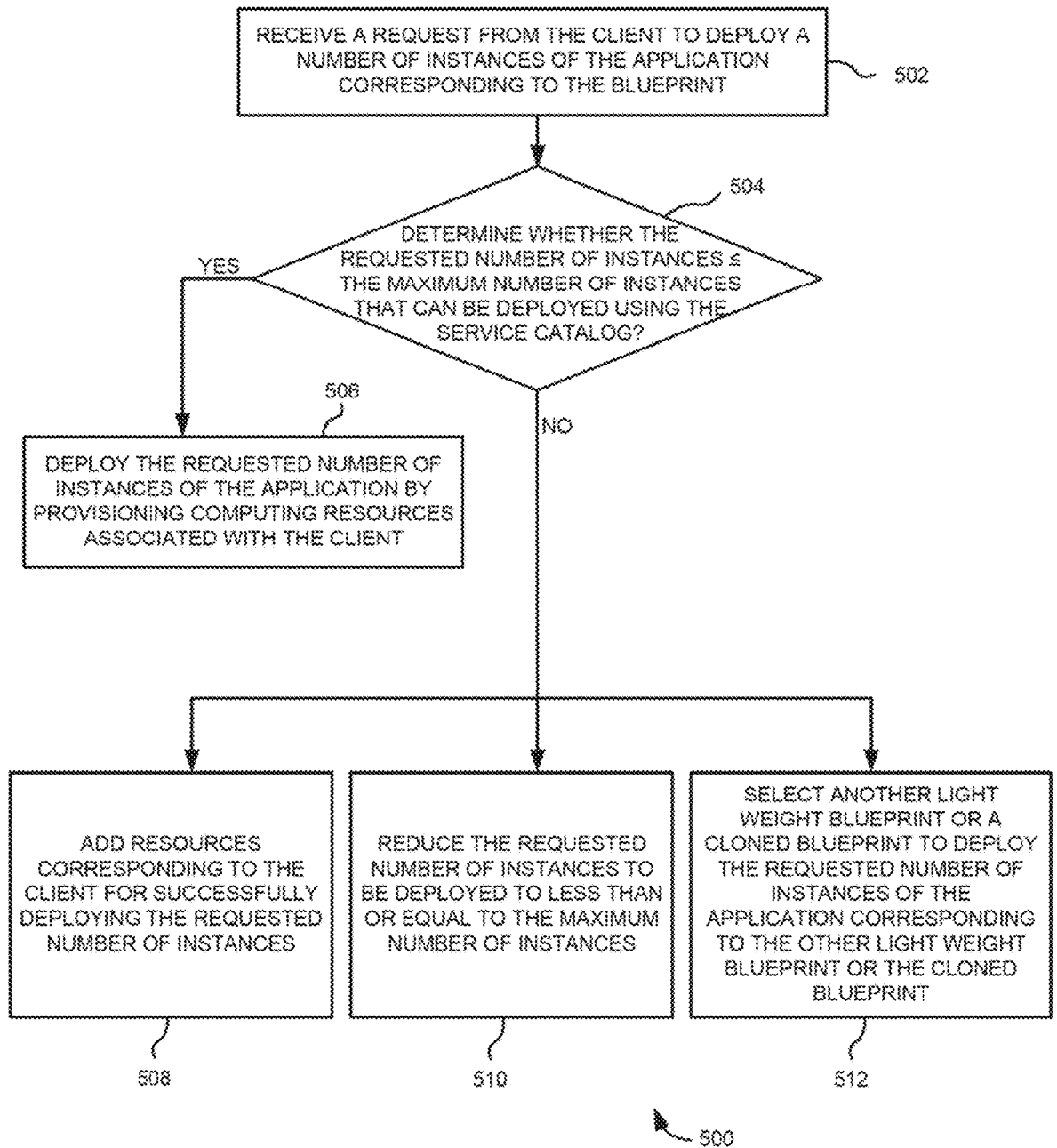

FIGS. 4 and 5 illustrate flow diagrams of example methods for deploying instances of the application based on service catalogs. It should be understood that the processes depicted in FIGS. 4 and 5 represent generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

Particularly, FIG. 4 illustrates a flow diagram 400 of an example method for generating service catalogs for use during deployment of the applications. Example applications may include multi-tier applications. At 402, resource information required to deploy an instance of an application may be retrieved by a server from a blueprint associated with a client. Example resource information may include information about resources selected from a group consisting of CPU, memory, and storage. In embodiments, the blueprint may specify how the application is to be deployed to a cloud infrastructure. In order to specify how a multi-tiered application (i.e., an application comprising multiple virtual machines) is to be deployed, the blueprint may specify the number of virtual machines to be deployed, the characteristics of each virtual machine (e.g., the amount of random access memory (RAM) and the number of virtual central processing units (CPUs) for each virtual machine), the system or application software that is to be installed on each virtual machine, and the order in which each virtual machine is to be deployed.

At 404, available resource information may be obtained by the server from a resource reservation associated with the client. In one example, updated available resource information may be dynamically obtained when a new resource is added, an existing resource is updated, or an existing resource is deleted from a management application (e.g., vSphere virtual center that is offered by VMware).

At 406, a maximum number of instances of the application that can be deployed corresponding to the client may be determined by the server based on the resource information required to deploy the instance of the application and the available resource information.

At 408, a service catalog including the maximum number of instances of the application that can be deployed may be generated by the server based on the blueprint. Further, the service catalog may be displayed by the server on a graphical user interface of the client showing the maximum number of instances of the application that can be deployed based on the blueprint. The service catalog may be used, for instance by an administrator, to enable deployment of at least one instance of the application corresponding to the client as explained in FIG. 5.

FIG. 5 illustrates a flow diagram 500 of an example method for deployment of the applications using the service catalog. At 502, a request may be received, from the client, to deploy a number of instances of the application corresponding to the blueprint by the server. At 504, a check is made by the server to determine whether the requested number of instances is less than or equal to the maximum number of instances that can be deployed using the service catalog. At 506, the requested number of instances of the application may be deployed by the server by provisioning computing resources associated with the client when the requested number of instances is less than or equal to the maximum number of instances that can be deployed. In this case, the service catalog may be updated with the available resources corresponding to the client before starting of deployment of the requested number of instances of the application. For example, the service catalog may be updated to show the updated maximum number of instances of the blueprints that can be deployed upon excluding the resources required for deployment of the requested number of instances corresponding to blueprint. In one example, the requested number of instances of the application may be deployed based on configuring one or more virtual machines to host the requested number of instances of the application using configuration properties associated with the blueprint. In one example, before the deployment starts, service catalogs can be updated with new available resources corresponding to the client.

When the requested number of instances is not less than the maximum number of instances that can be deployed, a notification may be provided by the server to perform at least one of add resources corresponding to the client for successfully deploying the requested number of instances (e.g., along with a cost estimation for adding the resources) (at 508), reduce the requested number of instances to be deployed to less than or equal to the maximum number of instances (at 510), and select another light weight blueprint or a cloned blueprint to deploy the requested number of instances of the application corresponding to the other light weight blueprint or the cloned blueprint (at 512). In one example, resources required to deploy the instance of the application corresponding to the other light weight blueprint is less than that of the blueprint. In another example, the cloned blueprint may allow the client to adjust/modify resources in the cloned blueprint in order to accommodate the requested number of instances of the application in available resources of the client. When the available resources of the client are not sufficient to deploy any instance of the application corresponding to the blueprint, then a request option to deploy instances of the application corresponding to the blueprint may be disabled in the service catalog.

Figure 6:
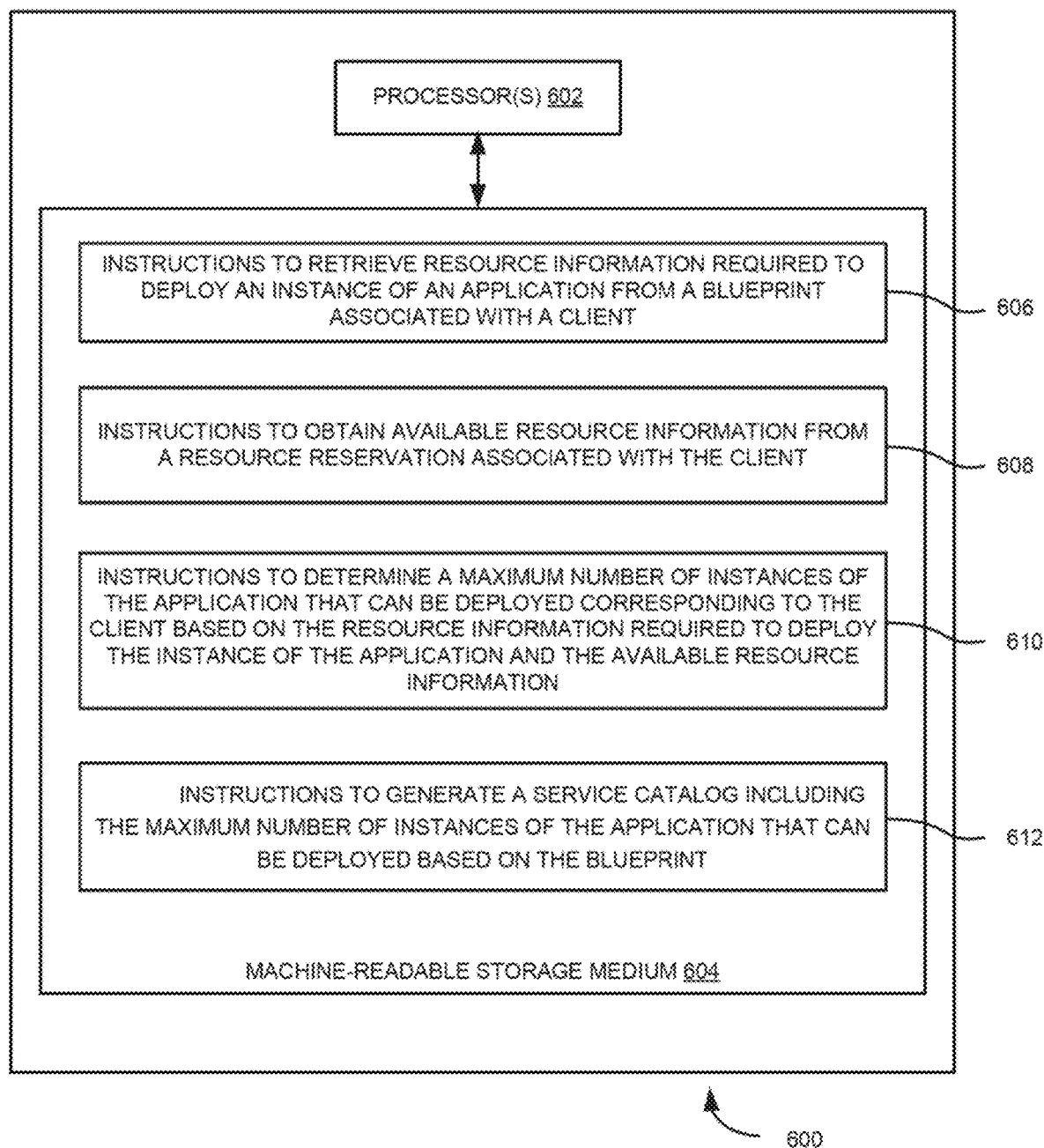
FIG. 6 is a block diagram of an example server including a non-transitory computer-readable storage medium storing instructions to deploy instances of the application based on service catalogs.

FIG. 6 is a block diagram of an example server 600 including a non-transitory computer-readable storage medium storing instructions to deploy instances of the application based on service catalogs. Server 600 (e.g., management server 102 of FIG. 1) includes a processor 602 and a machine-readable storage medium 604 communicatively coupled through a system bus. Processor 602 may be any type of central processing unit (CPU), microprocessor, or processing logic that interprets and executes machine-readable instructions stored in machine-readable storage medium 604. Machine-readable storage medium 604 may be a random-access memory (RAM) or another type of dynamic storage device that may store information and machine-readable instructions that may be executed by processor 602. For example, machine-readable storage medium 604 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 604 may be a non-transitory machine-readable medium. In an example, machine-readable storage medium 604 may be remote but accessible to server 600.

Machine-readable storage medium 604 may store instructions 606-612 that can be executed by processor 602. Instructions 606 may be executed by processor 602 to retrieve resource information required to deploy an instance of an application from a blueprint associated with a client. Instructions 608 may be executed by processor 602 to obtain available resource information from a resource reservation associated with the client.

Instructions 610 may be executed by processor 602 to determine a maximum number of instances of the application that can be deployed corresponding to the client based on the resource information required to deploy the instance of the application and the available resource information. Instructions 612 may be executed by processor 602 to generate a service catalog including the maximum number of instances of the application that can be deployed based on the blueprint. The service catalog may enable deployment of at least one instance of the application corresponding to the client.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A system comprising:
    a plurality of clients, with each client associated with a resource reservation; and
    a server coupled to the plurality of clients via one or more networks, wherein the server comprises a management module to:
        retrieve resource information required to deploy an instance of an application from a blueprint associated with a client;
        obtain available resource information from the resource reservation associated with the client;
        determine, by comparing the resource information required to deploy the instance of the application and the available resource information, a maximum number of instances of the application that can be deployed corresponding to the client, wherein the maximum number of instances is based at least in part on at least one successful deployment of one instance of the application corresponding to the client; and
        generate a service catalog including the maximum number of instances of the application that can be deployed based on the blueprint, wherein the service catalog is used to enable deployment of at least one instance of the application corresponding to the client; and
    wherein the server comprises a deployment module to:
        determine whether a requested number of instances for deployment of the application corresponding to the blueprint is less than the maximum number of instances that can be deployed using the service catalog; and
        deploy the requested number of instances of the application by provisioning computing resources associated with the client when the requested number of instances is less than or equal to the maximum number of instances that can be deployed.

2. The system of claim 1, wherein the management module is to display the service catalog on a graphical user interface of the client showing the maximum number of instances of the application that can be deployed based on the blueprint.

3. The system of claim 1, wherein the deployment module is further configured to:
    receive a request, from the client, to deploy the requested number of instances of the application corresponding to the blueprint.

4. The system of claim 3, wherein when the requested number of instances is not less than the maximum number of instances that can be deployed, the deployment module is to provide a notification to:
    add resources corresponding to the client for successfully deploying the requested number of instances;
    reduce the requested number of instances to be deployed to less than or equal to the maximum number of instances; and/or
    select another light weight blueprint or a cloned blueprint to deploy the requested number of instances of the application corresponding to the other light weight blueprint or the cloned blueprint, wherein resources required to deploy the instance of the application corresponding to the other light weight blueprint is less than that of the blueprint, and wherein the cloned blueprint allows the client to adjust resources in the cloned blueprint in order to accommodate the requested number of instances of the application in available resources of the client.

5. The system of claim 3, wherein the management module is to disable a request option to deploy instances of the application corresponding to the blueprint in the service catalog when the available resources are not sufficient to deploy any instance of the application corresponding to the blueprint.

6. The system of claim 1, wherein the resource information comprises information about resources selected from a group consisting of a central processing unit (CPU), memory, and storage.

7. The system of claim 1, wherein the management module is to dynamically obtain updated available resource information when a new resource is added, an existing resource is updated, or an existing resource is deleted from a management application.

8. The system of claim 1, wherein the client comprises a business group, a tenant, or an enterprise.

9. A method comprising:
retrieving, by a server, resource information required to deploy an instance of an application from a blueprint associated with a client;
obtaining, by the server, available resource information from a resource reservation associated with the client;
determining, by the server and by comparing the resource information required to deploy the instance of the application and the available resource information, a maximum number of instances of the application that can be deployed corresponding to the client, wherein the maximum number of instances is based at least in part on at least one successful deployment of one instance of the application corresponding to the client;
generating, by the server, a service catalog including the maximum number of instances of the application that can be deployed based on the blueprint, wherein the service catalog is used to enable deployment of at least one instance of the application corresponding to the client;
determining, by the server, whether a requested number of instances for deployment of the application according to the blueprint is less than or equal to the maximum number of instances that can be deployed using the service catalog; and
deploying, by the server, the requested number of instances of the application by provisioning computing resources associated with the client when the requested number of instances is less than or equal to the maximum number of instances that can be deployed.

10. The method of claim 9, comprising displaying, by the server, the service catalog on a graphical user interface of the client showing the maximum number of instances of the application that can be deployed based on the blueprint.

11. The method of claim 9, comprising:
receiving a request, from the client, to deploy the requested number of instances of the application corresponding to the blueprint by the server.

12. The method of claim 11, wherein deploying the requested number of instances of the application comprises:
deploying the requested number of instances of the application based on configuring one or more virtual machines to host the requested number of instances of the application using configuration properties associated with the blueprint.

13. The method of claim 11, wherein when the requested number of instances is not less than the maximum number of instances that can be deployed, providing a notification by the server to:
add resources corresponding to the client for successfully deploying the requested number of instances;
reduce the requested number of instances to be deployed to less than or equal to the maximum number of instances; and/or
select another light weight blueprint or a cloned blueprint to deploy the requested number of instances of the application corresponding to the other light weight blueprint or the cloned blueprint, wherein resources required to deploy the instance of the application corresponding to the other light weight blueprint is less than that of the blueprint, and wherein the cloned blueprint allows the client to adjust resources in the cloned blueprint in order to accommodate the requested number of instances of the application in available resources of the client.

14. The method of claim 11, comprising disabling, by the server, a request option to deploy instances of the application corresponding to the blueprint in the service catalog when the available resources are not sufficient to deploy any instance of the application corresponding to the blueprint.

15. The method of claim 9, wherein the resource information comprises information about resources selected from a group consisting of a central processing unit (CPU), memory, and storage.

16. The method of claim 9, wherein obtaining the available resource information from the resource reservation associated with the client comprises:
dynamically obtaining updated available resource information when a new resource is added, an existing resource is updated, or an existing resource is deleted from a management application.

17. A non-transitory machine-readable medium storing instructions executable by a server to:
retrieve resource information required to deploy an instance of an application from a blueprint associated with a client;
obtain available resource information from a resource reservation associated with the client;
determine, by comparing the resource information required to deploy the instance of the application and the available resource information, a maximum number of instances of the application that can be deployed corresponding to the client, wherein the maximum number of instances is based at least in part on at least one successful deployment of one instance of the application corresponding to the client;
generate a service catalog including the maximum number of instances of the application that can be deployed based on the blueprint, wherein the service catalog is used to enable deployment of at least one instance of the application corresponding to the client;
determine whether a requested number of instances for deployment of the application corresponding to the blueprint is less than the maximum number of instances that can be deployed using the service catalog; and
deploy the requested number of instances of the application by provisioning computing resources associated with the client when the requested number of instances is less than or equal to the maximum number of instances that can be deployed.

18. The non-transitory machine-readable medium of claim 17, comprising instructions executable by the server to:
display the service catalog on a graphical user interface of the client showing the maximum number of instances of the application that can be deployed based on the blueprint.

19. The non-transitory machine-readable medium of claim 17, comprising instructions executable by the server to:
receive a request, from the client, to deploy the requested number of instances of the application corresponding to the blueprint.

20. The non-transitory machine-readable medium of claim 19, wherein when the requested number of instances is not less than the maximum number of instances that can be deployed, the instructions further providing a notification by the server to:
- add resources corresponding to the client for successfully deploying the requested number of instances;
- reduce the requested number of instances to be deployed to less than or equal to the maximum number of instances; and/or
- select another light weight blueprint or a cloned blueprint to deploy the requested number of instances of the application corresponding to the other light weight blueprint or the cloned blueprint, wherein resources required to deploy the instance of the application corresponding to the other light weight blueprint is less than that of the blueprint, and wherein the cloned blueprint allows the client to adjust resources in the cloned blueprint in order to accommodate the requested number of instances of the application in available resources of the client.

21. The non-transitory machine-readable medium of claim 19, comprising instructions executable by the server to:
- disable a request option to deploy instances of the application corresponding to the blueprint in the service catalog when the available resources are not sufficient to deploy any instance of the application corresponding to the blueprint.

22. The non-transitory machine-readable medium of claim 17, wherein the resource information comprises information about resources selected from a group consisting of a central processing unit (CPU), memory, and storage.

23. The non-transitory machine-readable medium of claim 17, wherein obtaining the available resource information from the resource reservation associated with the client comprises:
- dynamically obtaining updated available resource information when a new resource is added, an existing resource is updated, or an existing resource is deleted from a management application.

* * * * *